United States Patent [19]
Vole

[11] Patent Number: 6,036,595
[45] Date of Patent: Mar. 14, 2000

[54] SAFETY SYSTEM FOR SMOKE AND FUMES

[76] Inventor: John Vole, 14736 W. Hwy. 22, Lincolnshire, Ill. 60069

[21] Appl. No.: 08/885,892

[22] Filed: Jun. 30, 1997

[51] Int. Cl.[7] .................................................. F24F 7/013
[52] U.S. Cl. .......................... 454/239; 49/31; 340/632; 454/195; 454/343
[58] Field of Search .................... 454/239, 353, 454/342, 343, 347, 350, 351, 195; 49/31; 340/632

[56] References Cited

U.S. PATENT DOCUMENTS

| | | | |
|---|---|---|---|
| 4,819,551 | 4/1989 | Vole | 454/343 |
| 4,928,583 | 5/1990 | Taylor et al. | 454/239 |

FOREIGN PATENT DOCUMENTS

| | | | |
|---|---|---|---|
| 59-38536 | 3/1984 | Japan | 454/239 |

*Primary Examiner*—Harold Joyce
*Attorney, Agent, or Firm*—Paul H. Gallagher

[57] ABSTRACT

A detector in a space to be sensed and controlled gives an electrical signal upon fumes in the space reaching a predetermined level. An electrical circuit is thereby energized to operate a fan to exhaust the space. Inlet and outlet openings in the structure enclosing the space are biased closed but open in response to air pressure on operation of the fan. Also the main door is opened by mechanism actuated by the signal. When the main door is open, the circuitry for opening the main door is open, and there is no actuating the apparatus.

3 Claims, 2 Drawing Sheets

6,036,595

1

SAFETY SYSTEM FOR SMOKE AND FUMES

FIELD OF THE INVENTION

The invention resides in the general field of detecting smoke and fumes, and controlling them, including controlling the facilities in which the smoke and fumes occur. Attention is directed to my prior U.S. Pat. No. 4,819,551, dated Apr. 11, 1989. The invention of that patent resides in the same general field, but the present apparatus includes additional features that can be included in the previous system for greater and more refined control.

As used herein, system includes both apparatus and method. As in the case of the invention of my prior patent referred to, the system of the present invention is well adapted to a garage for an automobile or car, although it is not limited to such installation. In many cases, a car is driven into a garage, and the door closed shortly thereafter. If the engine is left running, the noxious fumes develop rapidly, and it is desired to keep the environment, that is, the garage, clear of those fumes. A similar situation would exist for example in the home where gas escapes therein.

The apparatus incorporates a detector for detecting those fumes, and includes controls for clearing the fumes therefrom, when they occur, including a fan or blower, and openings in the garage through which the fan can expel the fumes and draw in fresh air. The garage is provided with openings made for such purpose, and the main garage door for the car, may also be utilized for drawing in fresh air.

The principal object of the present invention is to provide apparatus of the foregoing general character with additional features and advantages.

One such feature is that the fan is automatically turned off when the garage is clear of the fumes.

Another feature is that, the main garage door may be utilized for admitting fresh air into the garage.

A further feature is to provide such apparatus that can be installed in conjunction with a previous control installation such as disclosed in my above mentioned patent, without requiring any modification of the circuit of the older control apparatus, to enable both automatic control according to the older system, and manual control, when desired, by means of the present apparatus overriding the action of the older circuit.

Still another feature is that in the apparatus of the present invention, enables the user to manually actuate the individual controls of an older system, such as in the apparatus of the foregoing patent.

BRIEF DESCRIPTIONS OF THE INDIVIDUAL FIGURES OF THE DRAWINGS

DETAILED DESCRIPTION OF THE DRAWINGS

As referred to above, the device of the invention is particularly applicable to situations where fumes develop, a most common example of which is a garage for an automobile or car.

2

Figure 1:
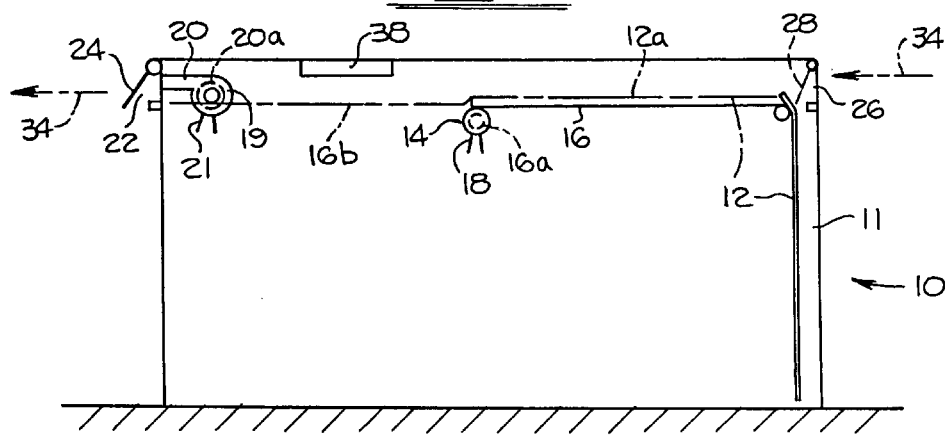
FIG. 1 is a diagrammatic view of a garage having a door, in which the device of the present invention is installed.
Figure 2:
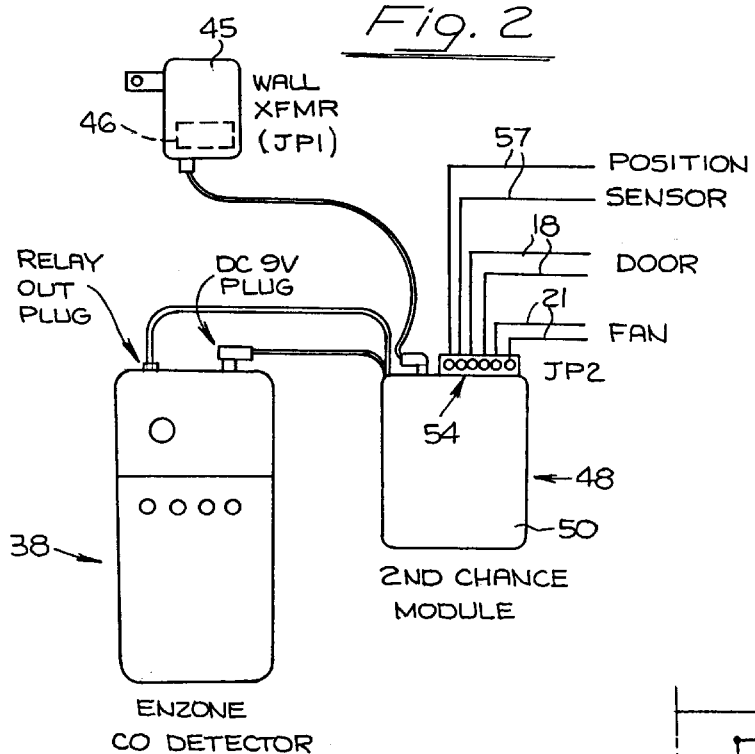
FIG. 2 is an assembly of elements including a novel component of the present invention.

Referring to the drawings generally, FIG. 1 shows a garage and certain components therein, and FIG. 2 shows control components to be installed in the garage, including a novel main component of the present invention.

FIG. 1 shows a detector or monitor 38 in the garage, as in the arrangement of my prior patent, and as referred to below.

Figure 3:
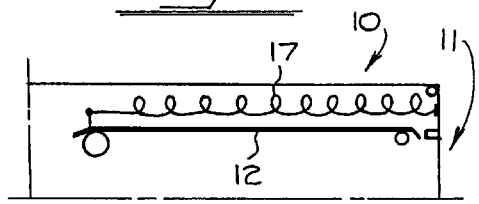
FIG. 3 is a fragmentary view of a detail of the garage door construction.

The garage is indicated at 10 in FIG. 1 and has a main opening 11 closed by the usual door 12 which in the present case, moves between a down or closed position, as indicated in full lines, and an upper or open position 12a, as indicated in dot-dash lines. The door is opened by a power unit or driver 14 which includes an electrical motor and a rigid driver link 16. The door may be operated in a suitable arrangement, in which the power unit 14 includes a pinion 16a, and the link 16 includes a rack cooperable with the pinion. The door is closed by driving the link 16 to the right (FIG. 1), and pushing the door closed, which may be done manually, or by manually controlling the motor to run it in reverse. As an alternative arrangement, the power unit may be utilized to open the door, after which it is automatically locked, and then manually releasing it, and enabling a spring 17 (FIG. 3) to close it. In the opening operation, the link 16 is moved back (to the left, FIG. 1) to a position shown at 16b, pulling the door to open position. The arrangement includes an electrical control circuit as will be referred to again hereinbelow. Electrical conductors 18 are shown (FIG. 1) leading from the motor of the driver 14, these conductors also being found in FIG. 6, at the lower right.

The means for exhausting fumes or smoke from the garage includes a fan or blower 19 (FIG. 1, left) having an exhaust conduit 20 leading to the exterior. In the present case the fan has an electrical drive motor 20a, having an electrical circuit with conductors 21 leading therefrom, these conductors also being found in FIG. 6 at the lower right. The conduit 20 leads through an opening 22 normally closed by an outer flap door 24. The opening 22 may be at one end of the garage and at the other end is a similar opening 26, closed by a flap door 28 on the inside. This opening 26 will be referred to again in connection with the main opening 11.

Figure 5:
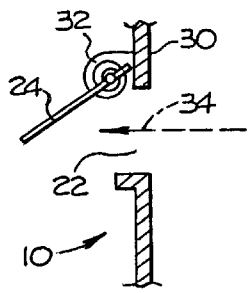
FIG. 5 is a detail fragmentary view of a means for closing an outlet passage of fumes from the garage.

FIG. 5 shows a specific form of construction of flap door, e.g. 24 or 26, mounted on a fixed element 30 on the garage and biased downwardly to closed position by a coil spring 32 but yielding to let the air flow through as indicated by the dotted line arrows 34 (see also FIG. 1).

The basic construction of the garage, and the installation of the safety arrangement therein, in the present case is similar to that of my prior patent referred to above, and for convenience, a brief description is first given of that arrangement, and particularly the detector means utilized. The detector 38 utilized in the present case is, in itself, known, and is often referred to as a smoke detector although similar devices respond to the presence of fumes and particularly carbon monoxide. As used herein fumes generically covers all noxious gases including carbon monoxide, and smoke detector generically includes all devices for detecting noxious fumes, and such that are operable that upon a concentration of the fumes reaching a certain level, they produce a signal which may be translated to a visual light signal or an audible signal, or both; in the present case such a signal, electrical in nature, is utilized for controlling electrical components for exhausting the fumes from the garage. In so exhausting the fumes, in addition to opening the inlet and outlet passages, 24, 26, the steps may also include opening the main garage door 12, as referred to again.

Figure 4:
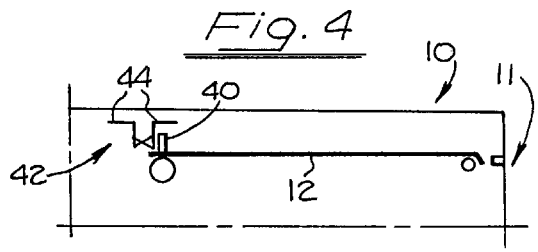
FIG. 4 is a fragmentary detail view of another feature of construction of the garage door.

The apparatus also includes means for sensing the door in its open position, as shown in FIG. 4. The door has a finger 40 engageable with switch means 42 connected with conductors 44. These conductors are included in the circuit for performing a certain function, when the door is in open position, as described hereinbelow.

Figure 6:
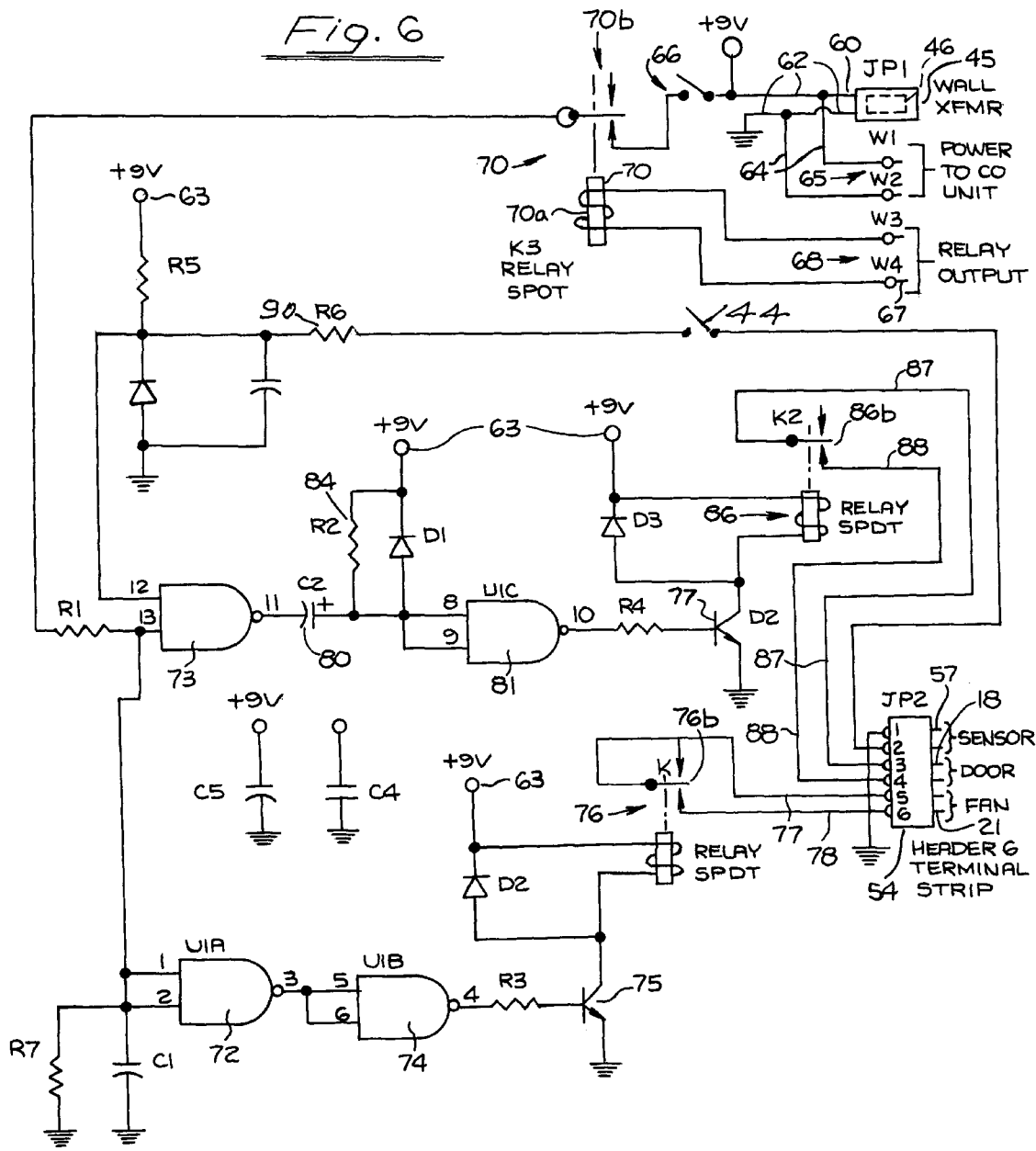
FIG. 6 is a schematic view of an electronic circuit in the novel component of FIG. 2.

Referring to the specific steps of detecting the fumes and exhausting them, the apparatus includes (FIG. 2) a power receptacle or plug 45 for plugging into a power source, e.g., 120 VAC, which includes what is generally known as a wall cube 46, for producing reduced voltage of 9 VDC which is used in the control circuit of FIG. 6.

A module 48 is shown, which constitutes a novel component of the present invention; it can be incorporated in a previously installed self-contained system as in my prior patent without modifying that system, as well as, of course, installing it as an entirely new system. This module is mechanically separate from the other components but connected therewith. It includes an outer casing 50 containing substantially all of the elements of the electronic circuit of FIG. 6. Included in the module is a terminal strip 54 from which outlet conductors 57, 18, 21 extend for conconnection with corresponding elements. This terminal strip is also shown in FIG. 6 at the bottom right.

Referring to the circuit of FIG. 6, the plug 45 is plugged into a power circuit, and it includes the cube 46. A plug 60 in the circuit is plugged into outlet and receives the outlet 9 V therefrom, providing a control current through conductors 62. The circuit of FIG. 6 includes a number of contacts 63 providing a 9 V source. Power to the unit is conducted through conductors 64 to contacts 65 for providing power to the circuit. A manually actuated switch 66 is provided for shutting OFF the entire circuit when desired, which may be positioned at any convenient location such as at a distance for remote control, and conductors 67 lead to contacts 68 for actuating a relay 70.

The detector 38 produces a pulsing signal, which in the present instance, according to its own character, is ON for 1–2 seconds, and OFF for 2–10 seconds. This signal energizes the relay 70, which includes a coil 70*a* and contacts 70*b*. Upon the contacts By closing, the potential of pins 1, 2 of gate 72 (bottom left) and pin 13 of gate (middle left) go HI to 9 V. Pin 3 of gate 72 then goes LO, causing pin 4 of gate 74 to go HI, to 9 V. This turns ON SCR 75, which causes energization of a relay 76. The contacts 76*b* upon being closed, close the circuit between conductors 77, 78, which then produce connection between the conductors 21 to turn ON the fan 19. At the same time that the foregoing step occurred, pin 3 of the gate 72 goes LO and pin 11 of gate 73 also goes LO. The output from these two steps proceeds through a capacitor 80 and to pins 8, 9 of gate 81. These pins, 8, 9, go LO, but they begin to rise in voltage as the capacitor 80 is charged through resistor 84. While the pins 8, 9 are LO, pin 10 of gate 81 is HI and it turns ON an SCR 77, and this turns ON a relay 86. The contacts 86*b* close, and connect conductors 87, 88, which acting through the terminal strip 54 (lower right), interconnect the conductors 18 to the opener for the main garage door 12.

After an initial period, e.g. 1 second, the capacitor 80 (middle right) is charged to 9 V causing the pins 8, 9 to go HI, and the pin 10 to go LO. This turns OFF capacitor 80 and the relay 86 (middle right), thus opening the contacts 86*b*.

If the main garage door 12 is open, that position is sensed through the switch means 44 (FIG. 4) that it is open. As a consequence, the signal is transmitted through conductors 87, 88 (FIG. 6, right) bringing the resistor 90 (FIG. 6, upper left) to zero or ground. This causes the pin 12 of gate 73 (middle right) to go LO, which stops pin 11 from going HI. This latter step prevents the contacts 86*b* (FIG. 6 middle right) from closing if the garage door is already open.

The relays 70 (top), 76 (lower right) 86 (middle right) are operable, as long as they are energized, for retaining the corresponding portions of the circuitry energized, and upon de-energization, enabling those positions to again become de-energized.

The detector is operable, according to its own internal law of operation, upon the level of noxious fumes lowering to a predetermined level, for producing a signal for returning the control circuit to original condition.

I claim:

1. Safety apparatus for use in an enclosure having an interior space wherein noxious fumes are produced, and the enclosure having a first inlet opening and an outlet opening, with closers normally closed but capable of being opened by air pressure, said apparatus comprising, the encloser having a main door moveable to closed and open positions, an electrical circuit, a fan operable for expelling gases from the interior space out through the outlet opening and drawing in fresh air from the exterior through the inlet opening into the interior space, a detector operable for producing an electrical signal upon the existence of noxious fumes at a predetermined level in the interior space, and the electrical circuit being capable of transmitting the signal to the fan for operating the fan, the detector being operable upon the level of the gases dropping below a predetermined level for terminating the electrical signal whereupon the fan ceases operating, means responsive to the main door being in open position for disabling the fan, means for closing the main door, and means operable upon termination of the electrical signal for actuating the closing means for the main door.

2. Safety apparatus according to claim 1, wherein, the electrical circuitry includes cancelling means actuated by the main door when the main door reaches its full open position, said cancelling means, when energized in response to the opening of the main door being operable for de-energizing and negating the means for opening the main door.

3. Safety apparatus according to claim 2, and including, a second component, which itself includes a transportable unit having electrical conductors and connector elements, the connector elements include plug-in means for each of a plurality of operating units, such as position sensor, door, fan, and for additional units, whereby to enable selective connection and disconnection, the apparatus includes electrical circuitry connected with the detector, the second component is interconnected between the detector and a power source, and the transportable unit is connected to the second component, and to the individual operating units.

\* \* \* \* \*